United States Patent Office 2,803,657
Patented Aug. 20, 1957

2,803,657
ACID STABILIZED TETRACYCLINE SALTS

Lawrence Ritter, Valley Cottage, N. Y., assignor to American Cyanamid Company, New York, N. Y., a corporation of Maine No Drawing. Application November 13, 1953,
Serial No. 392,050

4 Claims. (Cl. 260—559)

This invention relates to an intravenously administerable aqueous tetracycline preparation containing from 5 to 50 milligrams of tetracycline activity per milliliter of solution, and a method of preparing it.

It is desirable to be able to administer broad spectrum antibiotics intravenously, as in many instances a subject is unable or unwilling to swallow or accept them orally, and for animals, particularly, it may be difficult to administer the material orally. There is always a question as to whether or not the subject actually ingested the antibiotic, if administered orally.

A group of antibiotics of the tetracycline group including tetracycline, chlortetracycline, oxytetracycline, and bromotetracycline, possess many similarities, but also differences. Chlortetracycline hydrochloride may be dissolved in water and remains in solution. An attempt to administer tetracycline intravenously by dissolving it in water is unsuccessful, because tetracycline as the free base is comparably insoluble. As an acid salt, such as tetracycline hydrochloride, tetracycline dissolves to form a solution, but the solution while biologically stable does not remain storage stable, as in water solution as an acid salt of tetracycline, such as tetracycline hydrochloride, hydrolizes and releases the insoluble tetracycline base as a precipitate. The solubility of tetracycline hydrochloride in water varies markedly with the pH:

| pH | Solubility in Water after 24 Hours, Milligrams per Milliliter |
|---|---|
| 2.0 | 15.0 |
| 2.5 | 5.5 |
| 3.0 | 3.5 |
| 4.0 | 1.3 |
| 5.0 | 0.8 |
| 6.0 | 1.2 |
| 7.0 | 1.3 |
| 8.0 | 2.5 |
| 9.0 | over 10.0 |

When tetracycline hydrochloride is dissolved in pure water at a concentration of 10 milligrams per milliliter the pH is between about 2.6 and 2.8 when first formed and dissassociates with the precipitation of tetracycline as the free base within a few hours.

The exact solubility and the speed of hydrolysis and precipitation varies to a marked degree with the purity of the tetracycline acid salt. A small quantity of impurities associated therewith frequently causes the tetracycline acid salt to be more soluble, and as the purity of the product is improved the solubility decreases so that as the more desirable pharmaceutically pure preparations are obtained the solubility becomes less.

Whereas tetracycline and tetracycline hydrochloride, or other acid salts are storage stable for months or years in a dry state, in aqueous solutions tetracycline is not so stable, and accordingly, a dry material is needed for shelf stability which, on admixture with a diluent will form a solution which is stable biologically and mechanically for a period of at least 24 hours and preferably longer. The solution should not only retain its biological activity, but the material should also remain in solution without discoloration, precipitation or outward change.

Adding an acid to an acid salt of tetracycline, such as tetracycline hydrochloride, reverses the hydrolysis and prolongs the time that the material remains in solution.

The acid salt of tetracycline may be formed at the time of solution by providing tetracycline as the free base, or a basic salt, and diluting with a diluent in the presence of sufficient available acid to form the acid salt of tetracycline, and sufficient excess acid to prevent hydrolysis. The acid may be supplied to the vial containing the tetracycline or tetracycline acid salt as an acidified diluent; for example, acid water. The diluent may also contain saline, or nutrients such as protein hydrolysates or other compatible therapeutic constituents.

It is preferred to have the acid in the container with the tetracycline so that errors in choice of diluent are prevented, and the product may be diluted with sterile water, so that separate vials of diluent need not accompany the vials of antibiotic.

It is preferred to have a dry acid so that a shelf stable, powder preparation is obtained, and it is necessary that the acid be one which is not toxic or otherwise undesirable when administered intravenously. Acid salts, such as glycine hydrochloride are satisfactory acids. It is normally desired that the acid moiety of the added salt be different than the acid moiety associated with the tetracycline.

In many instances an organic acid is preferred. Hydroxy acids, such as citric acid or gluconic acid, are satisfactory, but may, if administered intravenously in large quantities, affect the calcium metabolism of the blood.

Ascorbic acid is unique in having all of the advantages of other acids, and additionally, is free from deleterious side reactions and tends to stabilize the color of the solution.

The amount of the acid to be added is such that the pH of the final product remains stable between about 1.5 and about 3.0, and preferably between about 2.0 and 2.4. Ascorbic acid will adjust the pH within this desired range, is independently useful as a vitamin, and is readily assimilated by the body. It is preferred to use between about 1.0 and about 5.0 parts of ascorbic acid per part of tetracycline acid salt, and the tetracycline acid salt is preferably the hydrochloride.

Other acids which may be used include citric acid, gluconic acid, niacinamide hydrochloride, glycine hydrochloride, glycine sulfate, glycine phosphate, lactic acid, tartaric acid, leucine sulfate, leucine hydrochloride, alpha-alanine hydrochloride, alpha-alanine sulfate, beta-alanine hydrochloride, beta-alanine sulfate, glutamic acid hydrochloride, glutamic acid sulfate, and other non-toxic soluble solid amino and amino-acid salts, such as the hydrochloride, sulfate, phosphate and nitrate, which, in solution in water, have a pH of less than 2.5.

Examples illustrative of this invention are:

*Example 1*

1,000 grams of tetracycline hydrochloride were intimately mixed and ground with 2,500 grams of ascorbic acid. The ground, dry mixture was filled into vials, sterilized by ethylene oxide, and the vials sterilely stoppered. The stoppered vials are storage stable. Stability tests indicate a shelf storage life, at room temperature, of over a year. When sufficient water is added to form a solution containing 10 milligrams of tetracycline per milliliter, a clear, storage stable solution is obtained which remains clear without precipitation for at least 24 hours at either room temperature of 3° C., without discoloration or without undue loss of antibiotic activity, thereby permitting a hospital to make up an entire day's supply at one time.

Example 2

1,000 grams of tetracycline hydrochloride, and 1,000 grams of gycine bisulfate ($CH_2NH_2COOH \cdot H_2SO_4$), were intimately mixed with grinding and sterilized with ethylene oxide. The dry, sterile material was aseptically filled into glass vials which were stoppered. The mixture in the stoppered vials was storage stable. When sufficient water is added to form a solution containing 10 milligrams of tetracycline hydrochloride per milliliter, the solution remains clear and therapeutically effective for at least 24 hours at either room temperature or 3° C.

I claim:

1. A composition of matter comprising a dry, ground, solid mixture of an acid salt of tetracycline and from about 1 to 5 parts by weight of a dry, solid, non-toxic, intravenously acceptable, water-soluble acid, the amount of said acid being sufficient to stabilize and keep in solution said acid salt of tetracycline when the composition is dissolved in water at a concentration of from 5 to 50 milligrams per milliliter of tetracycline and to give said solution a pH between 1.5 and 3.0.

2. A composition of matter comprising a dry, ground, solid mixture of an acid salt of tetracycline and from about 1 to 5 parts by weight of ascorbic acid, the amount of said ascorbic acid being sufficient to stabilize and keep in solution said acid salt of tetracycline when the composition is dissolved in water at a concentration of from 5 to 50 milligrams per milliliter of tetracycline and to give said solution a pH between 1.5 and 3.0.

3. A composition of matter comprising a dry, ground, solid mixture of tetracycline hydrochloride and from about 1 to 5 parts by weight of ascorbic acid, the amount of said ascorbic acid being sufficient to stabilize and keep in solution in said tetracycline hydrochloride when the composition is dissolved in water at a concentration of from 5 to 50 milligrams per milliliter of tertacycline and to give said solution a pH between 1.5 and 3.0.

4. A composition of matter comprising a dry, ground, solid mixture of an acid salt of tetracycline and from about 1 to 5 parts by weight of a dry, solid, non-toxic, intravenously acceptable, water-soluble acidic substance of the group consisting of citric acid, gluconic acid, niacinamide hydrochloride, glycine hydrochloride, glycine sulfate, glycine phosphate, lactic acid, tartaric acid, leucine sulfate, leucine hydrochloride, alpha-alanine hydrochloride, alpha-alanine sulfate, beta-alanine hydrochloride and glutamic acid sulfate, the amount of said acidic material being sufficient to stabilize and keep in solution said acid salt of tetracycline when the composition is dissolved in water at a concentration of from 5 to 50 milligrams per milliliter of tetracycline and to give said solution a pH between 1.5 and 3.0

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,603,584 | Pidacks et al. | July 15, 1952 |
| 2,644,782 | Harned et al. | July 7, 1953 |
| 2,644,783 | Weidenheimer et al. | July 7, 1953 |

OTHER REFERENCES

Regna et al.: "Ann. N. Y. Acad. Sci.," vol. 53, No. 2 (September 1950), pp. 229–236.

Boothe et al.: "J. Am. Chem. Soc.," vol. 75 (Sept. 20, 1953), p. 4621.